(12) United States Patent
Asakura

(10) Patent No.: US 6,834,129 B2
(45) Date of Patent: Dec. 21, 2004

(54) METHOD OF MEASURING ROTATION OF SPHERE

(75) Inventor: Takeshi Asakura, Kobe (JP)

(73) Assignee: Sumitomo Rubber Industries, Ltd., Hyogo-Ken (JP)

(*) Notice: Subject to any disclaimer, the term of this patent is extended or adjusted under 35 U.S.C. 154(b) by 594 days.

(21) Appl. No.: 09/816,325

(22) Filed: Mar. 26, 2001

(65) Prior Publication Data
US 2001/0043757 A1 Nov. 22, 2001

(30) Foreign Application Priority Data
Apr. 19, 2000 (JP) .................................... 2000-117561

(51) Int. Cl.⁷ .................................................. G01P 3/38
(52) U.S. Cl. ..................... 382/289; 473/199; 473/152; 473/153; 473/155; 473/156
(58) Field of Search .................. 382/289; 473/199, 473/151–156

(56) References Cited

U.S. PATENT DOCUMENTS

| | | | | |
|---|---|---|---|---|
| 5,471,383 A | * | 11/1995 | Gobush et al. | 700/91 |
| 5,611,723 A | * | 3/1997 | Mitoma et al. | 451/6 |
| 6,042,483 A | * | 3/2000 | Katayama | 473/199 |
| 6,226,416 B1 | * | 5/2001 | Ohshima et al. | 382/289 |
| 6,327,380 B1 | * | 12/2001 | Sciandra et al. | 382/154 |
| 6,458,035 B1 | * | 10/2002 | Katayama | 473/199 |

FOREIGN PATENT DOCUMENTS

| | | |
|---|---|---|
| JP | 7286837 | 10/1995 |
| JP | A019186 | 1/2000 |

\* cited by examiner

*Primary Examiner*—Leo Boudreau
*Assistant Examiner*—Patrick Edwards
(74) *Attorney, Agent, or Firm*—Birch, Stewart, Kolasch & Birch, LLP

(57) ABSTRACT

A flying sphere is photographed twice at a predetermined time interval and two static images thus obtained are used to measure a rotation of the sphere through an image processing based on a recognition mark of a surface of the sphere. The recognition mark includes a central mark having a directivity and a rotating angle calculating mark provided to surround the central mark. The central mark includes a rectangle and a circle provided apart from the rectangle adjacent to one of short sides of the rectangle. Three or more rotating angle calculating marks are provided. Respective center positions of the rotating angle calculating marks are present in a region provided apart from a center position of the central mark by 13 mm to 17 mm.

3 Claims, 3 Drawing Sheets

METHOD OF MEASURING ROTATION OF SPHERE

BACKGROUND OF THE INVENTION

1. Field of the Invention

The present invention relates to a method of measuring the rotation of a sphere such as a golf ball or a tennis ball, and to a measuring device to be used for the measuring method.

2. Description of the Related Art

When a golf ball is hit with a golf club, it flies with a so-called backspin. The backspin is a rotation setting a horizontal direction orthogonal to a hitting direction (which will be hereinafter referred to as a "z direction") to be an axis. A lift acts on the golf ball through backspin, thereby increasing the flight distance of the golf ball. In some cases, the golf ball flies with a so-called sidespin. The sidespin is a rotation setting a vertical direction (which will be hereinafter referred to as a "y direction") to be an axis. The golf ball turns left (a draw ball for a right-handed golfer) or turns right (a fade ball for the right-handed golfer) due to the sidespin. Furthermore, the golf ball sometimes flies with a rotation setting a horizontal direction identical to the hitting direction (which will be hereinafter referred to as an "direction") to be an axis.

In order to diagnose a golfer's swing form, it is effective to measure the rotating speed of the golf ball (which is obtained by measurement of a rotating angle). Moreover, it is also effective to measure the rotating speed in order to evaluate a golf ball or a golf club. In a stage in which the golf ball and the golf club are being developed, the rotating speed is inevitably measured.

U.S. Pat. No. 2,810,320 has disclosed a measuring method of photographing a flying golf ball twice at a predetermined time interval in one direction (usually the z direction) and calculating each axial rotating angle from two static images thus obtained. According to the measuring method, three recognition marks printed on a surface of the golf ball are read from a first static image and a second static image and a rotating angle is calculated based thereon. In the measuring method, the recognition marks are read mainly manually. The reason is that it is hard to automate work for causing three recognition marks appearing on the first static image and three recognition marks appearing on the second static image to correspond to each other, one to one.

Japanese Unexamined Patent Publication No. 2000-19186 has disclosed a method of measuring a rotation of a golf ball in which an isosceles triangle is used for a recognition mark. The isosceles triangle has a directivity. Therefore, measuring points (three apexes of the isosceles triangle) are caused to correspond to each other between two static images based on information about directions which are obtained from the isosceles triangle. Accordingly, it is possible to automatically measure a rotating angle through an image processing.

However, the recognition mark in the above-mentioned publication is small with respect to a diameter of the golf ball and the measuring points are close to each other. Therefore, in the case in which a reading error of the measuring point is made, an error of the rotating angle which is caused by the reading error is increased. In order to prevent errors from being made, it is necessary to sufficiently increase the size of the isosceles triangle. However, if the isosceles triangle is large, a part of the isosceles triangle is not photographed on the static image if the sidespin is applied. Consequently, there is a problem in that it is impossible to measure the rotating angle due to a shortage of the measuring points, the erroneous recognition of the shape of the recognition mark and the like.

SUMMARY OF THE INVENTION

In consideration of such problems, it is an object of the present invention to provide a method of measuring the rotation of a sphere in which the rotation can be measured automatically and the measurement can be mostly carried out even if the rotation is performed in a plurality of directions. Moreover, it is another object of the present invention to provide a measuring device to be used for the measuring method.

In the present invention, a recognition mark including a central mark having a directivity and three or more rotating angle calculating marks provided to surround the central mark is printed on a surface of a sphere.

A measuring method according to the present invention comprises the steps of:

photographing a flying sphere having the recognition mark printed thereon twice at a predetermined time interval; and calculating the amount of a rotation of the sphere through an image processing based on recognition marks of two static images obtained by the photographing.

A measuring device according to the present invention comprises a camera for photographing a flying sphere having the recognition mark printed thereon twice at a predetermined time interval;

storage means for recording data on two static images obtained by the photographing; and operation means for comparing the data on the two static images and calculating a rotating angle of the sphere based on the recognition mark.

In the present invention, the central mark has a directivity. Therefore, the information about directions of the surface of the golf ball are obtained from the central mark through the image processing. By using the information about directions, the three or more rotating angle calculating marks are distinguished from each other based on the positional relationship with the central mark. Accordingly, the respective rotating angle calculating marks are caused to correspond to each other with one to one between a first static image and a second static image. Therefore, the rotating angle can be calculated automatically through image processing. In addition, the three or more rotating angle calculating marks are provided. Therefore, also in the case in which a sidespin is slightly applied, there is a high possibility that at least two of the rotating angle calculating marks might remain on the static images and there is a low possibility that the rotating angle cannot be measured.

It is preferable that respective center positions of the rotating angle calculating marks should be present in a region provided apart from a center position of the central mark by 13 mm to 17 mm. Consequently, the measurement can be more significantly prevented from being disabled due to sidespin and the precision in the measurement of the rotating angle can be enhanced.

It is preferable that the central mark should be constituted by a rectangle and a circle provided apart from the rectangle adjacent to one of short sides of the rectangle. The central mark is constituted by a combination of comparatively simple shapes. Therefore, it is easy to recognize the shape through image processing. Accordingly, the precision in the recognition of the position of the central mark and the information about directions can be enhanced.

Preferably, the present invention provides a measuring method comprising the steps of:

photographing a flying sphere having a recognition mark printed thereon twice at a predetermined time interval;

recognizing a central mark in each of two static images obtained by the photographing;

distinguishing and recognizing rotating angle calculating marks in the respective static images based on information about directions which are obtained from the central mark;

selecting the rotating angle calculating mark to be used for calculating a rotating angle based on correspondence of the rotating angle calculating mark of one of the static images with the rotating angle calculating mark of the other static image; and calculating a rotating angle of the sphere from the selected rotating angle calculating mark.

The present invention will be described below in detail based on a preferred embodiment with reference to the drawings.

DESCRIPTION OF THE PREFERRED EMBODIMENTS

Figure 1:
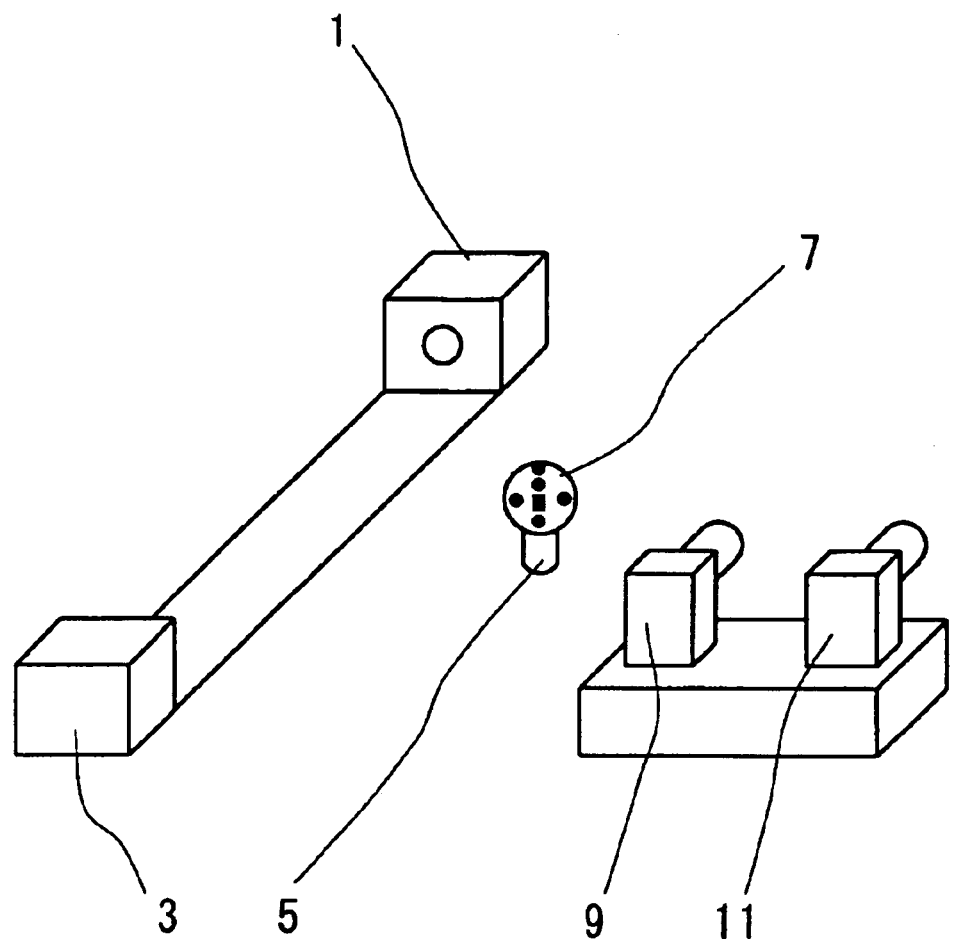
FIG. 1 is a perspective view showing a rotation measuring device according to an embodiment of the present invention.

FIG. 1 is a perspective view showing a rotation measuring device according to an embodiment of the present invention. FIG. 1 shows a sensor comprising a light emitting portion 1 and a light receiving portion 3, a tee 5, a golf ball 7 mounted on the tee 5, a first camera 9 and a second camera 11. A beam is emitted from the light emitting portion 1 toward the light receiving portion 3. A recognition mark to be described below in detail is printed on a surface of the golf ball 7. A direction from left to right in FIG. 1 indicates a hitting direction (y direction) of the golf ball 7.

Immediately after the golf ball 7 is hit and shot with a golf club, the first camera 9 and the second camera 11 photograph the golf ball 7. The sensor detects the passage of a head of the golf club and the photographing is then carried out after a predetermined time elapses. The photographing is carried out by the second camera 11 with a delay after the photographing operation of the first camera 9. More specifically, two static images for the flying golf ball 7 are obtained at a predetermined time interval through the first camera 9 and the second camera 11. Data on the static images are stored in storage means (for example, a RAM) of a computer which is not shown. The image data are compared with each other through operation means (for example, a CPU) and a rotating angle of the golf ball 7 is calculated as will be described below in detail (a so-called image processing).

In FIG. 1, the photographing is carried out by the first camera 9 and the second camera 11 in a z direction. The reason is that the golf ball 7 has a speed of a rotation (backspin) setting the z direction to be an axis which is much higher than a speed of a rotation setting another direction to be the axis. Of course, the photographing may be carried out in an x direction or a y direction depending on circumstances. The type of the first camera 9 and the second camera 11 is not particularly restricted but a CCD camera is suitable. Moreover, only one camera may carry out the photographing twice. Furthermore, an acoustic sensor or the like may be used for the sensor in place of the light emitting portion 1 and the light receiving portion 3.

Figure 2:
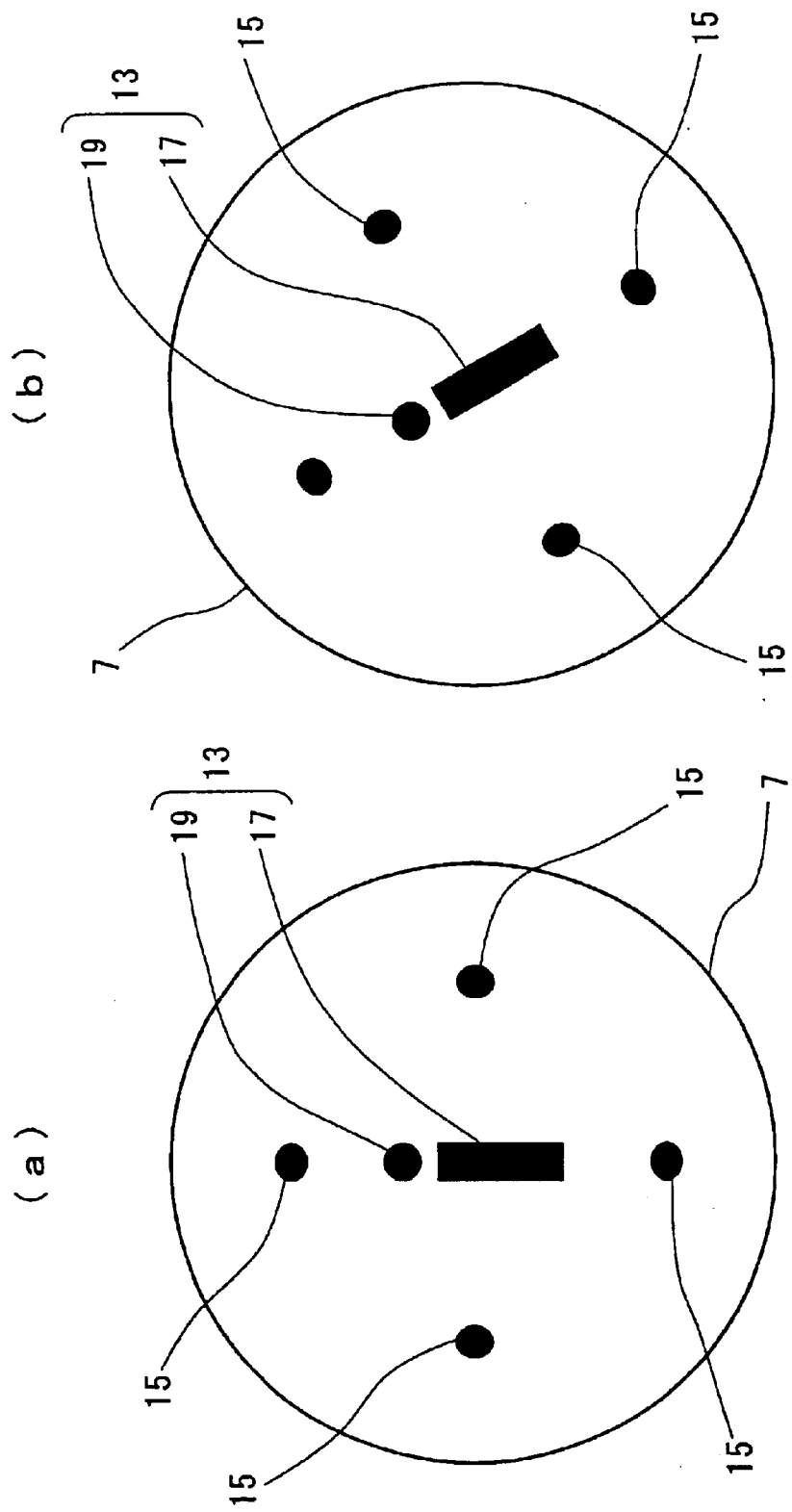
FIGS. 2A and 2B are front views showing respective static images photographed by two cameras in FIG. 1.

FIG. 2A is a front view showing a first static image photographed by the first camera 9 and FIG. 2B is a front view showing a second static image photographed by the second camera 11. As shown in these drawings, a black recognition mark is printed on the surface of the golf ball 7. Many dimples are formed on the surface of the golf ball 7, they are not shown in FIGS. 2A and 2B.

The recognition mark includes a central mark 13 and a rotating angle calculating mark 15. The central mark 13 has a black rectangle 17 and a black circle 19. The rectangle 17 and the circle 19 are provided apart from each other and the circle 19 is adjacent to one of short sides of the rectangle 17. More specifically, the central mark 13 has a shape similar to alphabetical "i". The central mark 13 is not restricted to the shape which is similar to the "i" but a mark having a directivity is enough. In this specification, "a mark having a directivity" implies a mark which is not overlapped with an original shape until a rotation of 360 degrees is carried out by setting a center thereof to be an axis. Accordingly, a mark having only a circular shape or a regular polygonal shape, for example, does not have the directivity. Moreover, since marks having only a rhombic shape or a parallelogrammic shape are 180-degree rotation symmetrical with each other, they do not have a directivity. Other marks having a directivity include an isosceles triangular shape (the concept of an isosceles triangle also includes an equilateral triangle which is omitted herein), a trapezoidal shape (the concept of a trapezoid also includes a parallelogram, a rhombus, a rectangle and a square which are omitted herein) and the like. Moreover, also in the case in which two or more marks having no directivity are combined to be 360-degree rotation symmetrical with each other, they wholly have a directivity. Since information about directions can easily be obtained through an image processing and a center position can readily be determined, the shape similar to the "i" shown in FIGS. 2A and 2B is preferable.

Four rotating angle calculating marks 15 are provided to surround the central mark 13. The rotating angle calculating mark 15 is a black circle. In FIGS. 2A and 2B, a state in which the golf ball 7 to be a sphere is projected onto a plane is photographed. Therefore, the rotating angle calculating mark 15 to be a circle is drawn as an ellipse. Of course, the rotating angle calculating mark 15 may be a regular polygon or the like in addition to the circle.

In order to calculate a rotating angle, first of all, the information about directions are obtained from the central mark 13 through the image processing. For example, an upward direction is set to be a reference direction in the first static image shown in FIG. 2A. Based on the relationship with the reference direction, the four rotating angle calculating marks 15 are distinguished from other rotating angle calculating marks 15, respectively. Similarly, the distinction is carried out in the second static image shown in FIG. 2B. Consequently, the individual rotating angle calculating marks 15 are caused to correspond to each other with one to one between the first static image and the second static image. Next, some (for example, three) marks to be used for calculating the rotating angle are selected from the central mark 13 and the four rotating angle calculating marks 15. Then, vector calculation is carried out by using the coordinates of center positions of the marks thus selected. Consequently, the rotating angle of the golf ball 7 is obtained. A rotating speed is calculated from the rotating angle and a time interval between the first static image and the second static image.

Figure 3:
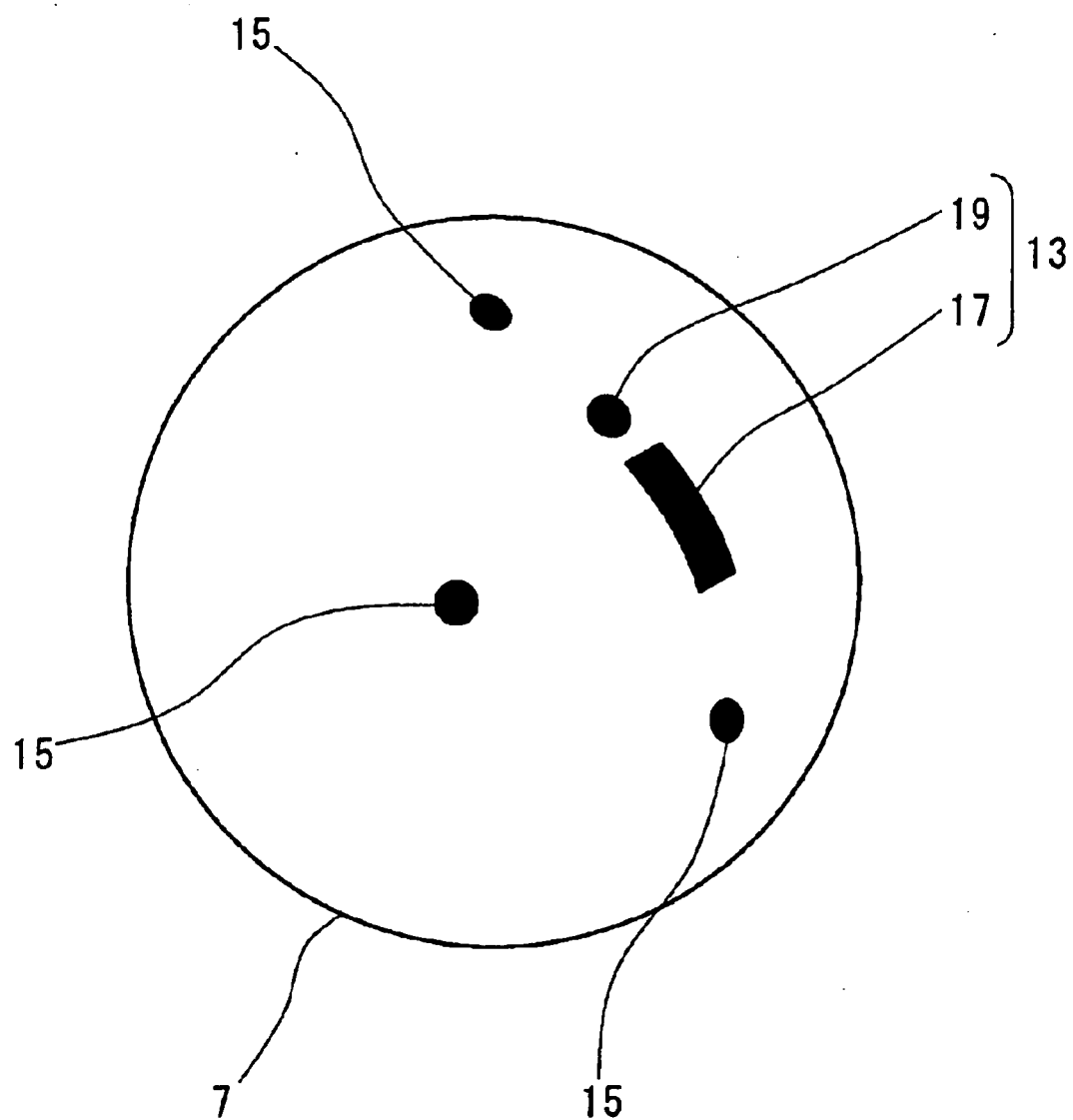
FIG. 3 is a front view showing another static image photographed by the camera in FIG. 1.

FIG. 3 is a front view showing another static image. In FIGS. 2A and 2B, only the backspin is applied to the golf ball 7, and the golf ball 7 is rotated only counterclockwise, but in FIG. 3, both the backspin and the sidespin (to cause a draw ball for a right-handed golfer) are applied. By the influence of the sidespin, one of the four rotating angle calculating marks 15 is not photographed on the static image. However, the three rotating angle calculating marks 15 and the central mark 13 are photographed. Therefore, the rotating angle can be calculated through the image processing. The rotating angle calculating mark 15 present in common to the two static images is used for the calculation of the rotating angle. Based on the vector calculation, rotating angles formed by setting x, y and z directions to be the axes are obtained. Of course, only a rotating angle formed by setting one of the directions to be the axis may be calculated or rotating angles in two optional directions may be calculated.

In order to prevent the calculation of the rotating angle from being disabled due to the sidespin, it is necessary to provide three or more rotating angle calculating marks 15. It is particularly preferable that four or more rotating angle calculating marks 15 should be provided. If the number of the rotating angle calculating marks 15 is too large, it is hard to mutually distinguish the rotating angle calculating marks 15 during the image processing. Therefore, it is preferable that six or less rotating angle calculating marks 15 should be provided.

Preferably, the rotating angle calculating mark 15 is present in a region provided apart from the center of the central mark 13 (a middle point of a line connecting an uppermost point of the circle 19 and a middle point of a lower short side of the rectangle 17 in FIG. 2A) by 13 mm to 17 mm, particularly, 14 mm to 16 mm. In some cases in which the rotating angle calculating mark 15 is closer to the central mark 13 than the region, the central mark 13 is distinguished from the rotating angle calculating mark 15 through the image processing with difficulty or a measurement error of the rotating angle is increased. In some cases in which the rotating angle calculating mark 15 is closer to the outside than the region, it is hard to recognize the rotating angle calculating mark 15 through the image processing. In particular, when the sidespin is great, this tendency is promoted. The rotating angle calculating mark 15 present in the region implies that the center of the rotating angle calculating mark 15 is present in the region. Moreover, a distance between the central mark 13 and the rotating angle calculating mark 15 is measured on a projected plane (that is, a static image) with the central mark 13 acting as a front face. The surface of the golf ball 7 is a spherical surface. Therefore, the distance on the spherical surface is greater than a projected distance.

It is preferable that each rotating angle calculating mark 15 should be provided at regular intervals if possible. Consequently, it is possible to more prevent the number of the rotating angle calculating marks 15 photographed on the static image from being insufficient. More specifically, if the number of the rotating angle calculating marks 15 is three, it is preferable that the adjacent rotating angle calculating marks 15 should be provided at a spacing between central angles of 60 degrees to 180 degrees, particularly, 90 degrees to 150 degrees (ideally 120 degrees). Moreover, if the number of the rotating angle calculating marks 15 is four, it is preferable that the adjacent rotating angle calculating marks 15 should be provided at a spacing between central angles of 45 degrees to 135 degrees, particularly, 68 degrees to 113 degrees (ideally 90 degrees). Furthermore, if the number of the rotating angle calculating marks 15 is five, it is preferable that the adjacent rotating angle calculating marks 15 should be provided at a spacing between central angles of 36 degrees to 108 degrees, particularly, 54 degrees to 90 degrees (ideally 72 degrees). Moreover, if the number of the rotating angle calculating marks 15 is six, it is preferable that the adjacent rotating angle calculating marks 15 should be provided at a spacing between central angles of 30 degrees to 90 degrees, particularly, 45 degrees to 75 degrees (ideally 60 degrees). The spacing between central angles is measured on the projected plane with the central mark 13 acting as a front face.

In the case in which the central mark 13 has the shape similar to "i", it is preferable that the circle 19 should have a diameter of 2 mm to 4 mm, particularly, 2.5 mm to 3.5 mm. In some cases in which the diameter is less than the above-mentioned range, it is hard to distinguish stains stuck to the golf ball 7 from the central mark 13. In some cases in which the diameter exceeds the above-mentioned range, it is hard to recognize the center of the circle 19 through the image processing particularly when the circle 19 is positioned close to a peripheral edge of the static image. Moreover, it is preferable that the short side of the rectangle 17 should be 0.2 to 1.0 time as great as the diameter of the circle 19, particularly, 0.5 to 0.9 time as great as the same diameter. In some cases in which the short side is less than the above-mentioned range, it is hard to recognize the central mark 13 through the image processing. In some cases in which the short side exceeds the above-mentioned range so that an image has a part of the rectangle 17 broken away due to reflection of light or the like, the image is not recognized as a rectangle in the image processing. Moreover, it is preferable that a long side of the rectangle 17 should be 4 mm to 10 mm, particularly, 6 mm to 9 mm. In some cases in which the long side is less than the above-mentioned range, the image is not recognized as the rectangle in the image processing. In some cases in which the long side exceeds the above-mentioned range, a combination of the rectangle 17 and the rotating angle calculating mark 15 is recognized as a shape similar to "i" and a reference direction is decided erroneously. A dimension of the central mark 13 is measured on the projected plane with the central mark 13 acting as a front face.

If the rotating angle calculating mark 15 is a circle, it is preferable that the diameter should be 2 mm to 4 mm, particularly, 2.5 mm to 3.5 mm. In some cases in which the diameter is less than the above-mentioned range, it is hard to distinguish the stains stuck to the golf ball 7 from the rotating angle calculating mark 15. In some cases in which the diameter exceeds the above-mentioned range, it is hard to recognize the center of the rotating angle calculating mark 15 through the image processing particularly when the rotating angle calculating mark 15 is positioned close to the peripheral edge of the static image. A dimension of the rotating angle calculating mark 15 is measured on the projected plane with the rotating angle calculating mark 15 acting as a front face.

In FIGS. 2A and 2B and FIG. 3, the central mark 13 and the rotating angle calculating mark 15 are blacked. Any color may be used for distinction from the surface of the golf ball 7. Since the golf ball 7 is usually white, an achromatic color or a chromatic color having a great lightness difference from a white color is used. It is preferable that the color of the mark should have a lightness difference of 10 or more from the surface of the golf ball 7.

EXAMPLES

While the effects of the present invention will be apparent from examples, the present invention should not be construed to be restrictive based on the description of the examples.

Example 1

A recognition mark including a central mark having a shape similar to "i" constituted by a rectangle and a circle and four circular rotating angle calculating marks provided at an interval of 90 degrees to surround the central mark as shown in FIGS. 2A and 2B and FIG. 3 was printed on a surface of a golf ball. A distance between a center position of the central mark and that of the rotating angle calculating mark was set to 15 mm and a diameter of the rotating angle calculating mark was set to 3 mm. Moreover, a diameter of a circle of the central mark was set to 3 mm, a short side of the rectangle was set to 2.1 mm, a long side of the rectangle was set to 7 mm and a gap between the circle and the rectangle was set to have a distance of 2 mm. The golf ball was hit with a golf club (W1) attached to a swing robot and was photographed by a measuring device shown in FIG. 1 so that two static images were obtained. Rotating angles of a backspin and a sidespin were calculated from these static images through an image processing. The calculation was repeated 100 times in total by hitting each of ten golf balls ten times. The conditions of the swing robot were adjusted such that the rotating angle of the backspin is approximately 3000 rpm and the rotating speed of the sidespin is approximately 200 rpm. For the measurement, the following items (1) to (3) were evaluated.

(1) Ratio of Generation of Mark Disappearance

There was calculated a ratio at which a static image having a part of a recognition mark broken away is obtained so as not to carry out an image processing.

(2) Ratio of Recognition Defective of Rotating Angle Calculating Mark

There was calculated a ratio at which the recognition defective of a rotating angle calculating mark is generated through the image processing. The recognition defective was generated when the rotating angle calculating mark was flatly photographed on a peripheral edge so that the presence could not be recognized and when stains stuck to the surface of the golf ball are erroneously recognized as a rotating angle calculating mark through repetitive hitting.

(3) Ratio of Recognition Defective of Central Mark

There was calculated a ratio at which the recognition defective of a central mark is generated through the image processing. The recognition defective was generated when adjacent rotating angle calculating marks are erroneously recognized as a part of the central mark.

Examples 2 to 4

A rotating angle was measured in the same manner as that in the example 1 except that a distance between a center position of a central mark and that of a rotating angle calculating mark is set to have a value shown in the following Table 1. For the measurement, the same evaluation as that in the example 1 was carried out.

Examples 5 and 6

A rotating angle was measured in the same manner as that in the example 1 except that a diameter of a rotating angle calculating mark has a value shown in the following Table 1. For the measurement, the same evaluation as that in the example 1 was carried out.

Comparative Example

A rotating angle was measured in the same manner as that in the example 1 except that a recognition mark is an isosceles triangle having a base of 24 mm and two oblique lines of 35 mm. For the measurement, the same evaluation as that in the example 1 was carried out.

TABLE 1

Results of Evaluation of Method of Measuring a Rotating Angle of a Golf Ball

| | Ex. 2 | EX. 3 | EX. 5 | EX. 1 | EX. 6 | EX. 4 | Compa. Ex. |
|---|---|---|---|---|---|---|---|
| Rotating angle calculating mark | | | | | | | |
| Distance from central mark (mm) | 11.5 | 13 | 15 | 15 | 15 | 17 | — |
| Diameter (mm) | 3 | 3 | 2 | 3 | 4 | 3 | — |
| Ratio of generation of mark disappearance (%) | 8 | 6 | 9 | 4 | 4 | 4 | 21 |
| Ratio of recognition defective of rotationg angle calculating mark (%) | 1 | 2 | 3 | 3 | 3 | 11 | — |
| Ratio of recognition defective of central mark (%) | 9 | 6 | 2 | 2 | 4 | 2 | — |

In the measuring method according to each example, as shown in the Table 1, the ratio of generation of mark disappearance is smaller than that of the measuring method according to the comparative example. The reason is as follows. There are three or more rotating angle calculating marks. Therefore, even if a part is not photographed on a static image, the rotating angle can be calculated from residual rotating angle calculating marks and the central mark. Based on the results of evaluation, the advantages of the present invention could be confirmed.

The above description is only illustrative and various changes may be made without departing from the scope of the invention. The measuring method according to the present invention can be used for all spheres to fly with a rotation, for example, a tennis ball.

What is claimed is:

1. A measuring method comprising the steps of:

photographing a flying sphere having printed thereon a recognition mark including a central mark having a directivity and three or more rotating angle calculating marks provided to surround the central mark twice at a predetermined time interval;

recognizing a central mark in each of two static images obtained by the photographing;

distinguishing and recognizing the rotating angle calculating marks in the respective static images based on information about directions which are obtained from the central mark;

selecting the rotating angle calculating mark to be used for calculating a rotating angle based on correspondence of the rotating angle calculating mark of one of the static images with the rotating angle calculating mark of the other static image; and calculating a rotating angle of the sphere from the selected rotating angle calculating mark.

2. The measuring method according to claim 1, wherein respective center positions of the rotating angle calculating marks are present in a region provided apart from a center position of the central mark by 13 mm to 17 mm.

3. The measuring method according to claim 1, wherein the central mark is constituted by a rectangle and a circle provided apart from the rectangle adjacent to one of short sides of the rectangle.

* * * * *